(12) United States Patent
Debban, Jr. et al.

(10) Patent No.: US 6,778,745 B2
(45) Date of Patent: Aug. 17, 2004

(54) OPTICAL FIBER CABLE APPARATUS HAVING ENCASED RIBBON STACK

(75) Inventors: Harold P Debban, Jr., Snellville, GA (US); Clyde Jefferson Lever, Jr., Buford, GA (US); Richard Norris, Powder Springs, GA (US); Dennis M Slaton, Gainsville, GA (US); Richard Dalton Small, Jr., Lilburn, GA (US); Phillip M Thomas, Suwanee, GA (US); Peter A Weimann, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 270 days.

(21) Appl. No.: 09/938,107

(22) Filed: Aug. 23, 2001

(65) Prior Publication Data

US 2004/0091221 A1 May 13, 2004

(51) Int. Cl.[7] .................................................. G02B 6/44
(52) U.S. Cl. ............................................................. 385/114
(58) Field of Search ........................ 385/100, 109–112, 385/114, 102–108

(56) References Cited

U.S. PATENT DOCUMENTS

| | | | |
|---|---|---|---|
| 4,859,023 A | 8/1989 | Eichenbaum et al. | 350/96.23 |
| 5,155,789 A | 10/1992 | Le Noane et al. | 385/106 |
| 5,229,851 A | 7/1993 | Rahman | 385/114 |
| 5,531,064 A | 7/1996 | Sawano et al. | 57/204 |
| 5,621,842 A * | 4/1997 | Keller | 385/114 |
| 5,751,880 A | 5/1998 | Gaillard | 385/109 |
| 5,857,051 A | 1/1999 | Travieso et al. | 385/114 |
| 5,878,180 A * | 3/1999 | Nothofer et al. | 385/114 |
| 6,035,087 A | 3/2000 | Bonicel et al. | 385/109 |
| 6,192,178 B1 * | 2/2001 | Logan et al. | 385/109 |

* cited by examiner

Primary Examiner—Khiem Nguyen

(57) ABSTRACT

Embodiments of the invention include an optical fiber cable having improved optical fiber densities and no central strength member. The optical fiber cable includes one or more multi-fiber unit tubes having an optical fiber ribbon stack snugly positioned therein. The diagonal length of the ribbon stack is approximately equal or, alternatively, at least 90% of the inner diameter of the unit tube. The multi-fiber unit tube is made of low-density polyethylene (LDPE) or other material soft and flexible enough to allow the ribbon stack to be relatively firmly positioned therein without affecting the optical fiber performance. The optical fiber cable includes one or more filling materials such as yarn fillers positioned, e.g., between the ribbon stack and the inner walls of the unit tube, to maintain the shape of the multi-fiber unit tube. The yarn filler material includes super absorbent polymers to reduce propagation of water down the unit tube.

28 Claims, 5 Drawing Sheets

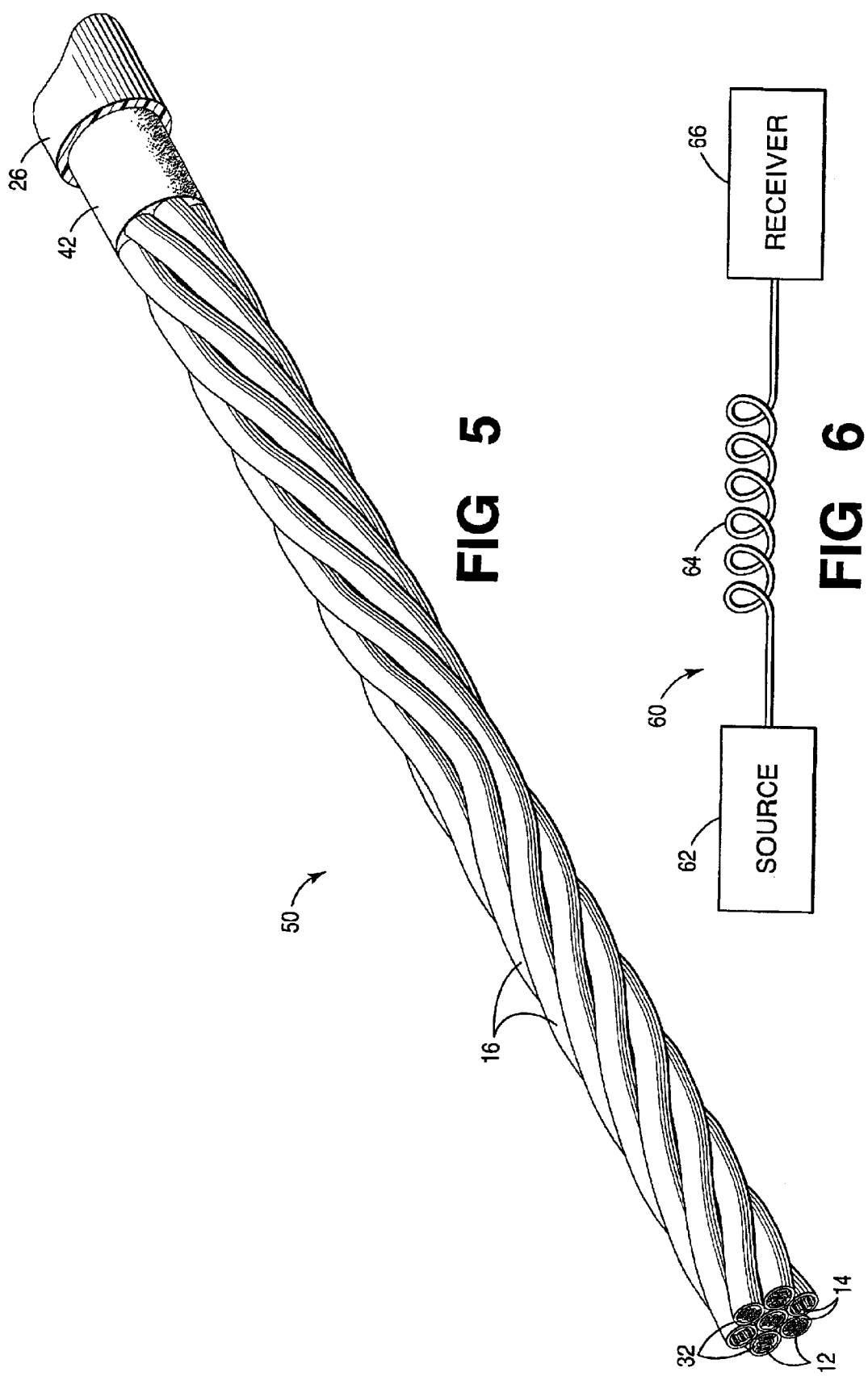

US 6,778,745 B2

OPTICAL FIBER CABLE APPARATUS HAVING ENCASED RIBBON STACK

FIELD OF THE INVENTION

The invention relates to optical fiber cabling. More particularly, the invention elates to optical fiber cables apparatus having stacked ribbon fibers therein, and systems using such apparatus.

BACKGROUND OF THE INVENTION

Optical cables typically comprise one or more multi-fiber units such as a multi-fiber unit tube. A multi-fiber unit tube typically contains a plurality of individual optical fibers disposed therein. In some configurations, the optical fibers are arranged loosely within the multi-fiber unit tube. See, e.g., U.S. Pat No. 5,751,880. However, such arrangements have relatively low fiber packing densities and many applications desire optical fiber cables that have higher fiber packing densities. See, e.g., U.S. Pat No. 5,155,789, in which the optical fiber cable comprises a plurality of supporting sheaths each tightly bound around a plurality of optical fibers.

Alternative optical fiber cable configurations include multi-fiber unit tubes having one or more optical fiber ribbons disposed therein. The optical fiber ribbons typically are stacked within the multi-fiber unit tube to form what is referred to as a ribbon stack or optical fiber ribbon stack. See, e.g., U.S. Pat Nos. 5,857,051 and 5,229,851.

Many conventional optical fiber ribbon stack arrangements include various kinds of filler materials, such as hydrophobic (water blocking) and hydrophilic (water absorbing) gels, powders, yarns and tapes. For example, see U.S. Pat No. 6,035,087, which discloses an optical fiber cable that uses a hydrophobic gel 7 (see, e.g., FIG. 3), and U.S. Pat No. 4,867,526, which discloses an optical fiber cable that uses a hydrophobic tape between the transmission media and the outer jacket of the cable. Also, e.g., see U.S. Pat No. 5,751,880, which discloses an optical fiber cable that uses a hydrophilic water swelling material.

Also, most conventional optical fiber cable configurations include a strength member, often located centrally within the cable and surrounded by a plurality of multi-fiber unit tube, or embedded or otherwise formed in one of the cable layers (i.e., in a protective sheath surrounding the multi-fiber unit tubes. For example, see U.S. Pat. No. 5,857,051 (FIG. 4), which is assigned to the assignee of this application, U.S. Pat Nos. 5,229,851, and 5,531,064 (FIGS. 1 and 5). However, also see U.S. Pat. No. 4,859,023, which is assigned to the assignee of this application, which discusses a method for making an optical fiber cable that does not include compressive strength members.

It would be desirable to have available optical fiber cables, including ribbon-stacked optical fiber cables, with improved optical fiber densities. Also, it is desirable for such optical fiber cables to not rely on dedicated strength members disposed therein for overall tensile strength and crush resistance.

SUMMARY OF THE INVENTION

The invention is embodied in an optical fiber cable having improved optical fiber densities and no central strength member. The optical fiber cable includes one or more multi-fiber unit tubes having an optical fiber ribbon stack snugly positioned therein. According to embodiments of the invention, the diagonal length of the ribbon stack is approximately equal to the inner diameter of the multi-fiber unit tube or, alternatively, the ratio of the ribbon stack diagonal length to the multi-fiber unit tube inner diameter is at least 0.90. The multi-fiber unit tube is made of a material suitably soft and flexible to allow the ribbon stack to be relatively firmly positioned within the multi-fiber unit tube without compromising the optical performance of the fibers in the ribbon stack. The multi-fiber unit tube is made of, e.g., low-density polyethylene (LDPE), and has a modulus less than approximately 70,000 pounds per square inch (psi). The ribbon stack comprises any suitable number of optical fiber ribbons stacked to form an array of fibers, e.g., a 12-fiber stack formed by 3 4-fiber ribbons stacked together, or a 144-fiber stack formed by stacking together 12 12-fiber ribbons. Also, the optical fiber cable includes one or more filling materials such as stranded yarn fillers positioned, e.g., between the ribbon stack and the multi-fiber unit tube, to maintain the shape of the multi-fiber unit tube. Alternatively, the yam filler material is impregnated with otherwise includes super absorbent powder (SAP).

BRIEF DESCRIPTION OF THE DRAWINGS

In the drawings:

FIG. 5 is a perspective view of an optical fiber cable according to yet another embodiment of the invention; and FIG. 6 is a simplified schematic diagram of an optical system in which embodiments of the invention are useful.

DETAILED DESCRIPTION

Figure 1:
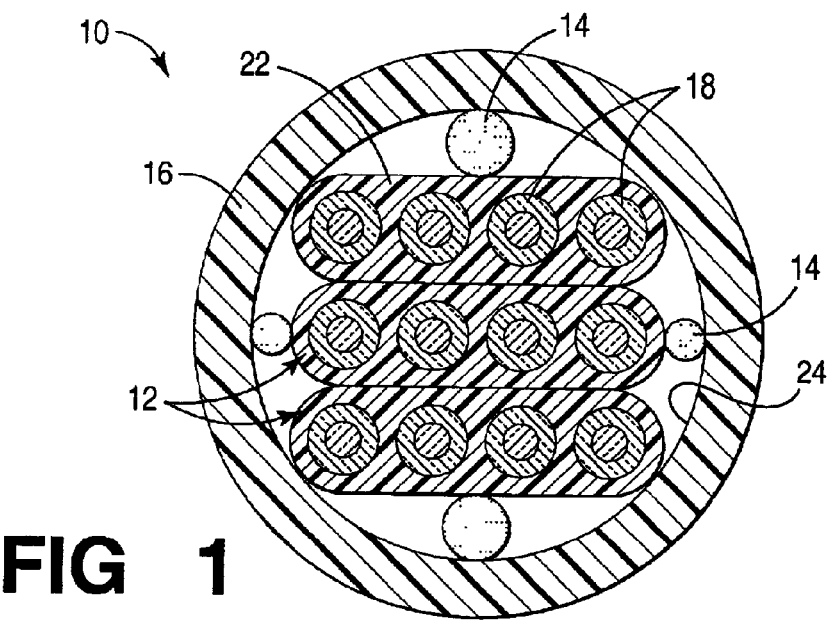
FIG. 1 is a cross-sectional view of an optical fiber cable according to an embodiment of the invention.

In the following description, similar components are referred to by the same reference numeral to enhance the understanding of the invention through the description of the drawings. Also, unless otherwise explicitly specified herein, the drawings are not drawn to scale.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is an optical fiber cable 10 according to embodiments of the invention. The optical fiber cable 10 includes a stacked plurality of optical fiber ribbons 12 and one or more filling or filler materials 14 surrounded by or otherwise encased in a multi-fiber unit tube 16. The optical fiber ribbons 12 typically have a plurality of optical fibers 18 that are bound together laterally by a matrix material 22 as a single, linear array of optical fibers 18. The optical fiber ribbons 12 are stacked, thus forming a generally square or rectangular shape, which shape typically is better suited for positioning within the multi-fiber Unit tube 16, which typically is generally round or parabolic. In accordance with embodiments of the invention, the number of optical fibers per ribbon and the number of stacked fiber ribbons depend on, e.g., the dimensions of the fiber ribbons 12 and the dimensions of the multi-fiber unit tube 16 in which the fiber ribbons are encased. Thus, although the arrangement in FIG. 1 shows a 3×4 array of optical fibers (e.g., 3 ribbons having 4 fibers per ribbon), other optical fiber arrays are suitable, as will be discussed in greater detail herein below.

Conventionally, multi-fiber unit tubes are made of polyethylene, polyethylenebased alloys, plasticized polyvinylchloride (PVC), polypropylene, polybutylene terephtalate, polycarbonate, polyamides (e.g., nylons), impact modified polypropylene, and polypropylene alloys. The modulus of such materials typically is within the range from approximately 75,000 to 400,000 pounds per square inch (psi) at 75° Fahrenheit (F).

However, according to embodiments of the invention, the multi-fiber unit tube 16 is made of a softer material, e.g., a material or materials having a modulus of 70,000 psi or less. More specifically, the multi-fiber unit tube 16 is made of a relatively soft, flexible, thin-walled, easy-to-handle and extrudable material having a modulus, e.g., of less than approximately 70,000 psi. For example, the multi-fiber unit tube 16 is made of Dow Chemical DFDA-6115-NT low-density polyethylene (LDPE), which has a Young's modulus of 26,000 psi and a hardness of 56 shore D (94.5 shore A) at 25° Celsius (C). Other suitable materials include, e.g., linear low-density polyethylene, ultra-low-density polyethylene, highly plasticized polyvinylchloride, extrudable thermoplastic elastomers, ethylene/vinyl acetate copolymers, ethylenelacrylic acid copolymers and flexible polyolefin-based elastomers. Accordingly, the multi-fiber unit tube 16 is more flexible than conventional unit tubes, thus allowing for easier entry and routing than conventional unit tubes.

Unlike conventional optical fiber arrangements, especially conventional loose tube arrangements, optical fiber cables according to embodiments of the invention provide an encasement for the stacked fiber ribbons 12 in the multi-fiber unit tube 16 that is tight enough to allow for increased fiber stack density. Also, according to embodiments of the invention, the multi-fiber unit tube 16 is soft enough and flexible enough not to disturb the optical performance of the fibers in the ribbon stack 12 positioned therein. Such is provided by, e.g., by the combination of a multi-fiber unit tube 16 made of a material that is relatively soft and flexible, and its particular dimensions as they compare to the dimensions of the fiber ribbon stack 12 therein. Such arrangement is referred to as an encased ribbon stack (ERS).

For example, according to an embodiment of the invention, the inner diameter (D) of the multi-fiber unit tube is approximately equal to the diagonal length (d) of the stack of optical fiber ribbons 12 positioned therein. That is, the comers of the stack of optical fiber ribbons 12 touch or nearly touch an inner wall 24 of the multi-fiber unit tube 16. Alternatively, the corners of the stack of optical fiber ribbons 12 slightly press into the inner wall 24 of the multi-fiber unit tube 16. However, as just discussed, the relative softness and flexibility of the multi-fiber unit tube 16 does not disturb the optical performance of the optical fibers pressing into the multi-fiber unit tube 16.

Conventionally, the ratio (d/D) of the diagonal length of a stacked fiber ribbons 12 to the inner diameter of its multi-fiber unit tube 16 is approximately 0.50 to 0.80. According to embodiments of the invention, the ratio d/D is approximately equal to 1.0 or, alternatively, at least 0.90 or within the range from approximately 0.90 to 0.95.

For example, for a 12×12 array of optical fibers, the inner diameter of the multi-fiber unit tube 16 is approximately 0.187 inch and the diagonal length of the stacked fiber ribbons 12 is approximately 0.185 to 0.187 inch. Also, for example, for a 3×4 array of optical fibers, the inner diameter of the multi-fiber unit tube 16 is approximately 0.055 inch and the diagonal length of the stacked fiber ribbons 12 is approximately 0.0055 inch.

Typically, the thickness of the walls of the multi-fiber unit tube 16 is within the range from approximately 0.003 to 0.02 inches.

Positioning the ribbon stack 12 in the multi-fiber unit tube 16 in accordance with embodiments of the invention typically forms four separate regions or pockets between the sides of the ribbon stack 12 and the inner wall 24 of the multi-fiber unit tube 16, e.g., as shown in FIG. 1. The filler material 14 is positioned or otherwise disposed in one or more of these regions. According to embodiments of the invention, the filler material is a hydrophobic, thixotropic gel. The hydrophobic nature of the gel prevents or reduces undesirable propagation of water down the multi-fiber unit tube. A suitable gel material is, e.g., Mastergel R-1838, manufactured by Master Adhesives, Inc., Norcross Ga. Other suitable gels include, e.g., Bufferite 230, manufactured by CasChem, Inc., Carlstadt, N.J., and K550, manufactured by InformationLab Ltd., Annacotty, Ireland.

According to other embodiments of the invention, the filler material comprises, e.g., a woven strand of yarn or other suitable material such as a nonwoven tape. These "dry" filler materials typically contain hydrophilic superabsorbent polymers (SAP) to prevent or reduce propagation of water down the multi-fiber unit tube. The superabsorbent polymers are contained in the filler, e.g., in the form of fibers or powders. For example, according to embodiments of the invention, suitable yarn materials include, e.g., WSY-00850 (WC at a nominal diameter of 0.50 millimeter (mm), WWH-01700, WSY-1500, WSY-2000 at a nominal diameter of 1.0 mm, and WSY-3000 or WWY-04500 at a nominal diameter of 1.5 mm, all manufactured by Lantor Universal Carbon Fibers, Cleckheaton, England. Other suitable yams include, e.g., GTA 35 manufactured by Geca-Tapes, Rijen, The Netherlands.

According to embodiments of the invention, the filler material 14 is, e.g., woven or otherwise formed to keep its shape once positioned in the multi-fiber unit tube 16. Moreover, the filler material 14 acts to generally round out or otherwise maintain the shape of the multi-fiber unit tube 16. According to embodiments of the invention that use water-swellable yarns or nonwoven tapes, the strands of filler material 14 are dimensioned just large enough to maintain the general circular or other shape of the multi-fiber unit tube 16 around the ribbon stack 12. Such roundness of the multi-fiber unit tube 16 allows relatively free rotation of the ribbon stack 12 within the multi-fiber unit tube, which rotation is useful for not inhibiting optical performance.

Depending on the size and configuration of the ribbon stack 12, in some embodiments of the invention, the four regions between the ribbon stack 12 and the multi-fiber unit tube 16 are equal or approximately equal in area. In such arrangements, the diameter of the strands of the yarn filler materials typically are equal or approximately equal. For example, for an embodiment of the invention in which the inner diameter of the multi-fiber unit tube 16 is 0.187 inch, and the ribbon stack is a 12×12 array of fibers having a height and width of approximately 0.131×0.131 inch (and thus a diagonal length of approximately 0.185 inch), the area of the region between the ribbon stack 12 and the multi-fiber unit tube 16) is approximately 0.0026 in$^2$ per region. For such configuration, according to embodiments of the invention, the diameter (d) of the yarn filler material 14 is, e.g., approximately 0.05 inch (i.e., approximately 1.27 mm).

Also, according to other embodiments of the invention, the ribbon stack 12 often is more rectangular than square, thus creating two regions between the ribbon stack 12 and the multi-fiber unit tube 16 that are slightly larger and two regions between the ribbon stack 12 and the multi-fiber unit tube 16 that are slightly smaller.

In this arrangement, the two larger regions typically are equal or nearly equal in area and are located across from one another, and the two smaller regions typically are equal or nearly equal in area and are located across from one another.

For example, for an embodiment of the invention in which the inner diameter of the multi-fiber unit tube 16 is 0.187 inch, and the ribbon stack is a 12×12 array of fibers having a height of 0.137 inch, a width of 0.124 inch (and thus a diagonal length of 0.185 inch), the area of the larger regions (between the ribbon stack 12 and the multi-fiber unit tube 16) is 0.0046 in$^2$ and the area of the smaller regions is 0.0030 in$^2$.

For such configuration, according to embodiments of the invention, the diameter (d) of the yarn filler material 14 positioned in the larger regions is, e.g., approximately 0.0765 inches (1.94 millimeters), and the diameter (d) of the yarn filler material 14 positioned in the smaller regions is, e.g., approximately 0.0620 inches (1.57 mm).

Figure 2A:
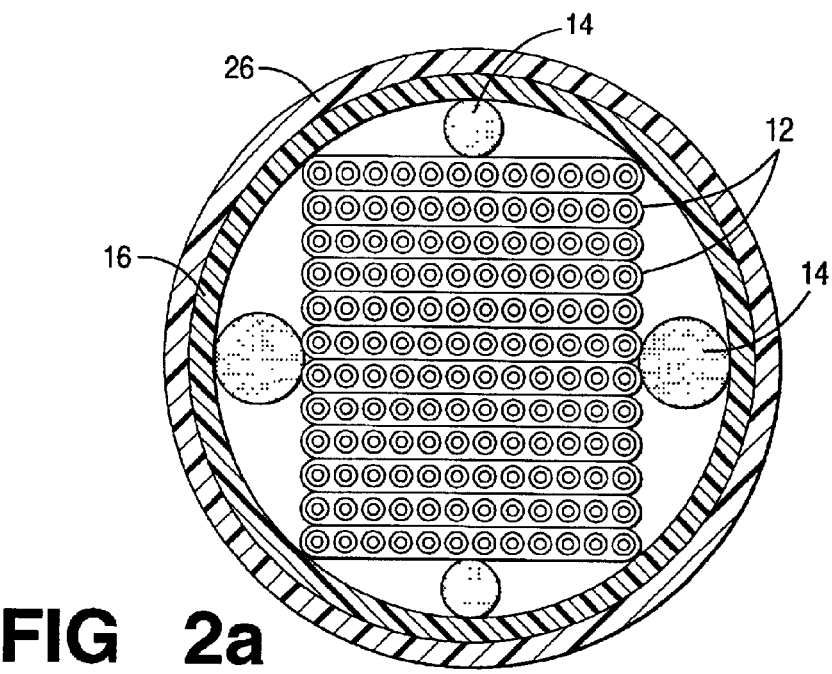
FIGS. 2a –2f are cross-sectional views of optical fiber cables according to alternative embodiments of the invention.
Figure 2B:
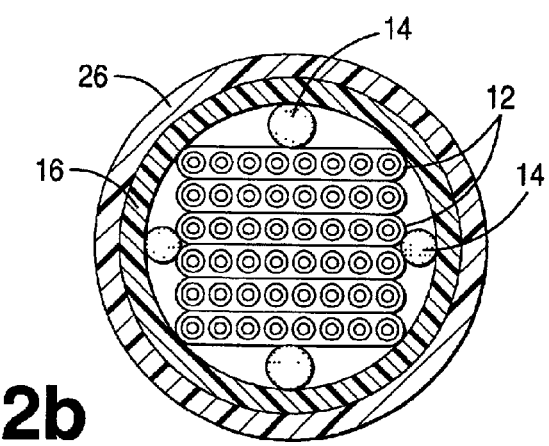
Figure 2C:
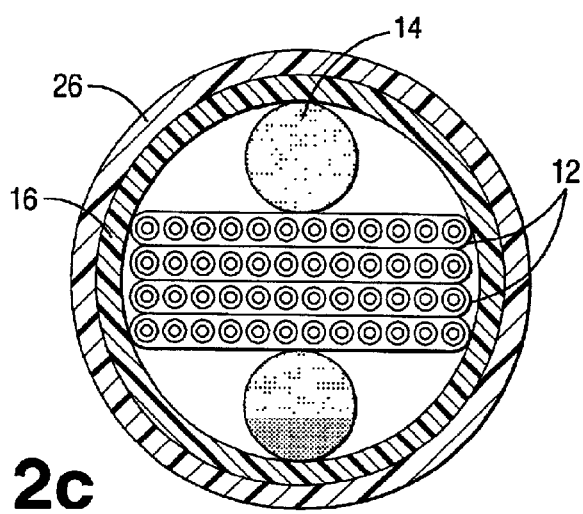
Figure 2D:
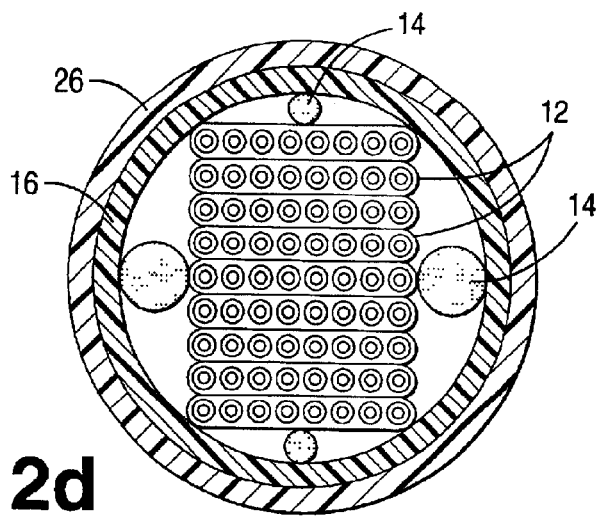
Figure 2E:
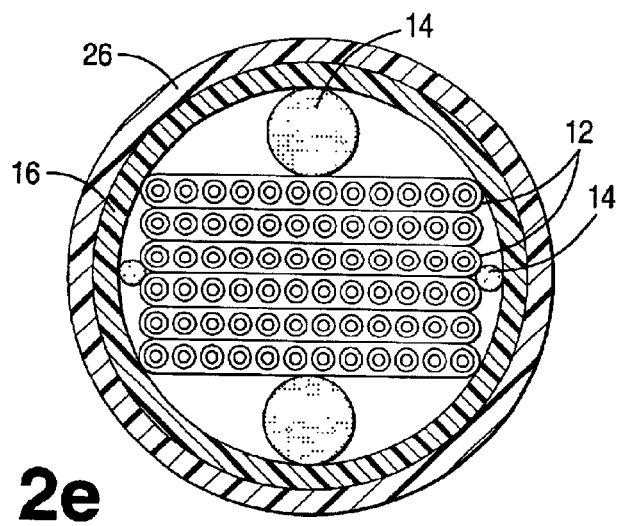
Figure 2F:
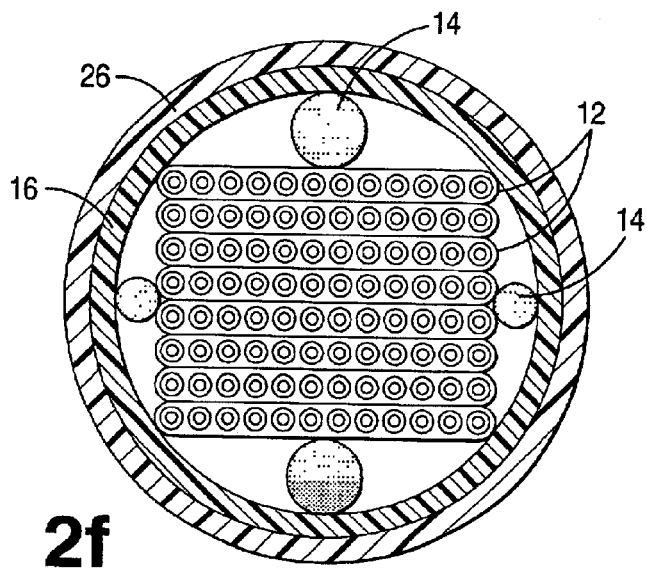

As mentioned previously herein, according to embodiments of the invention, ribbon stack arrangements other than the 3×4 array shown in FIG. 1 are suitable for positioning in the multi-fiber unit tube 16. For example, see the various arrangements shown in FIGS. 2a–f. For example, FIG. 2a shows a 144 -fiber (12×12) arrangement positioned in a multi-fiber unit tube 16 having an inner diameter of approximately 0.187 inch. FIGS. 2b and 2c show various 48 -fiber arrangements: a 6×8 ribbon stack array (e.g., 6 ribbons having 8 fibers per ribbon) in FIG. 2b and a 4×12 ribbon stack array (e.g., 4 ribbons having 12 fibers per ribbon) in FIG. 2c. FIGS. 2d–e show various 2-fiber arrangements: a 9×8 ribbon stack array (e.g., 9 ribbons having 8 fibers per ribbon) in FIG. 2d and a 6×12 ribbon stack array (e.g., 6 ribbons having 8 fibers per ribbon) in FIG. 2e. In FIG. 2f, a 96 -fiber arrangement (8 ribbons having 12 fibers per ribbon) is shown.

As can be seen in the configurations according to embodiments of the invention, no central strength member or other strength member is used. The relatively tight packing arrangement of the ribbon stack 12 in the multi-fiber unit tube 16 allows the ribbon stack 12 to function singularly as a backbone for the multi-fiber unit tube 16. In this manner, arrangements according to embodiments of the invention reduce buckling of the multi-fiber unit tube 16 without the use of a strength member.

Also, the filler material 14 positioned between the ribbon stack 12 and the multi-fiber unit tube 16 assists in filling out the cable 10, i.e., maintaining the shape of the cable 10, thus providing the cable 10 with the strength and support it conventionally would get from a central strength member. Thus, the lack of a central strength member is overcome by the contribution of the configuration of the ribbon stack 12 in the multi-fiber unit tube 16 and, alternatively, the addition of the filler material 14 between the ribbon stack 12 and the multi-fiber unit tube 16, to the existing anti-buckling properties of the multi-fiber unit tube 16 itself.

Alternatively, embodiments of the invention also include a protective jacket or sheath formed around the multi-fiber unit tube 16. The protective jacket is made of, e.g., a high-density polyethylene (HDPE) jacket or one or more other suitable materials, including medium-density polyethylene, linear low-density polyethylene, polyvinylchloride, impact-modified polypropylene, polyamides, or a low-smoke zero-halogen filled polyolefin.

According to alternative embodiments of the invention, optical fiber ribbon cables include one or more strength members, e.g., formed within a protective jacket or sheath that houses one or more multi-fiber unit tubes. The strength member is made of, e.g., a rod or roving made of steel, glass, or other suitable material.

Figure 3:
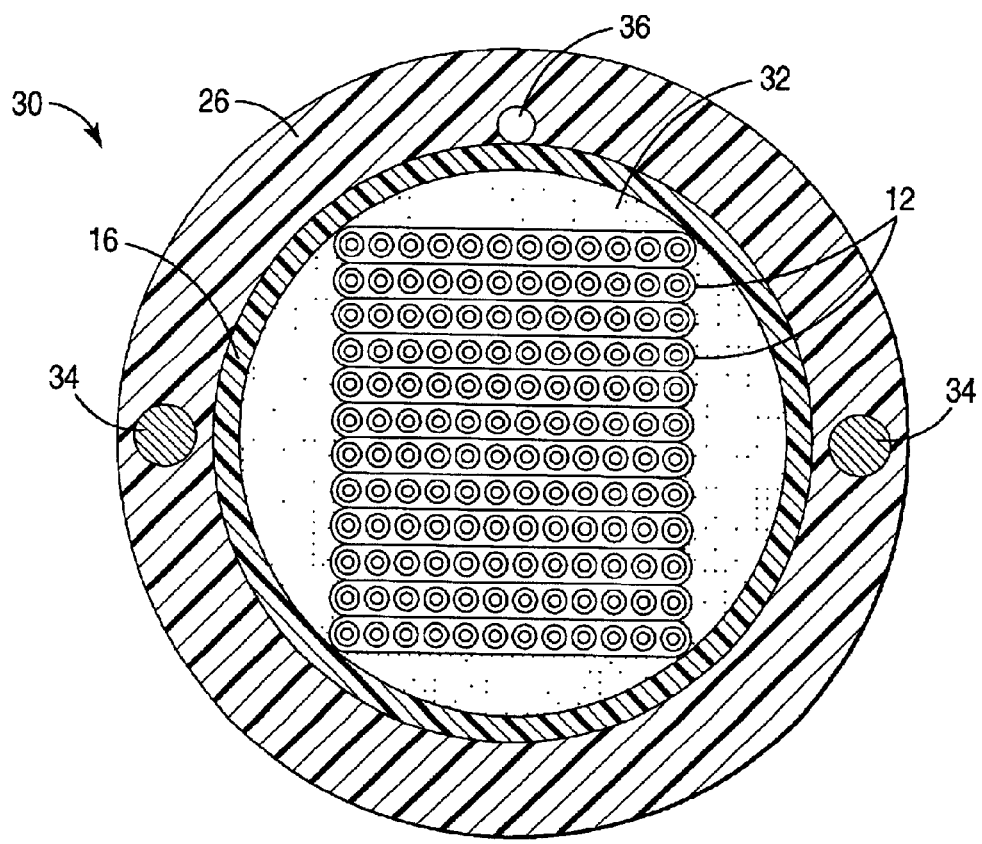
FIG. 3 is a cross-sectional view of an optical fiber cable according to yet another embodiment of the invention.

More specifically, referring now to FIG. 3, shown is a cross-sectional view of an optical fiber cable 30 according to an alternative embodiment of the invention. In this arrangement, the optical fiber cable 30 includes a filling compound 32 in the area between the ribbon stack 12 and the multi-fiber unit tube 16. The filling compound 32 is a hydrophobic grease or gel or other suitable hydrophobic filling compound.

A protective jacket 26 is formed around a single multi-fiber unit tube 16, e.g., as discussed hereinabove. The protective jacket 26 is made of, e.g., high-density polyethylene (HDPE) or other suitable material such as a high-density polyethylene (HDPE), medium-density polyethylene (MDPE), linear low-density polyethylene (LLDPE), polyvinylchloride (PVC), polyamides, and low-smoke zero-halogen filled polyolefins. In this embodiment, the protective jacket 26 includes one or more strength members 34 formed therein. The strength members 34 are made of, e.g., steel, a glass-epoxy composite, an araid-epoxy composite, a hybrid glass-aramidepoxy composite, glass yarn, aramid yarn, or other suitable material. Also, the protective jacket 26 includes a ripcord 36 formed therein. The ripcord 36, which is made of, e.g., polyester or other suitable material, facilitates entry into the optical fiber cable 30 and provides improved access to the multi-fiber unit tube 16.

Figure 4:
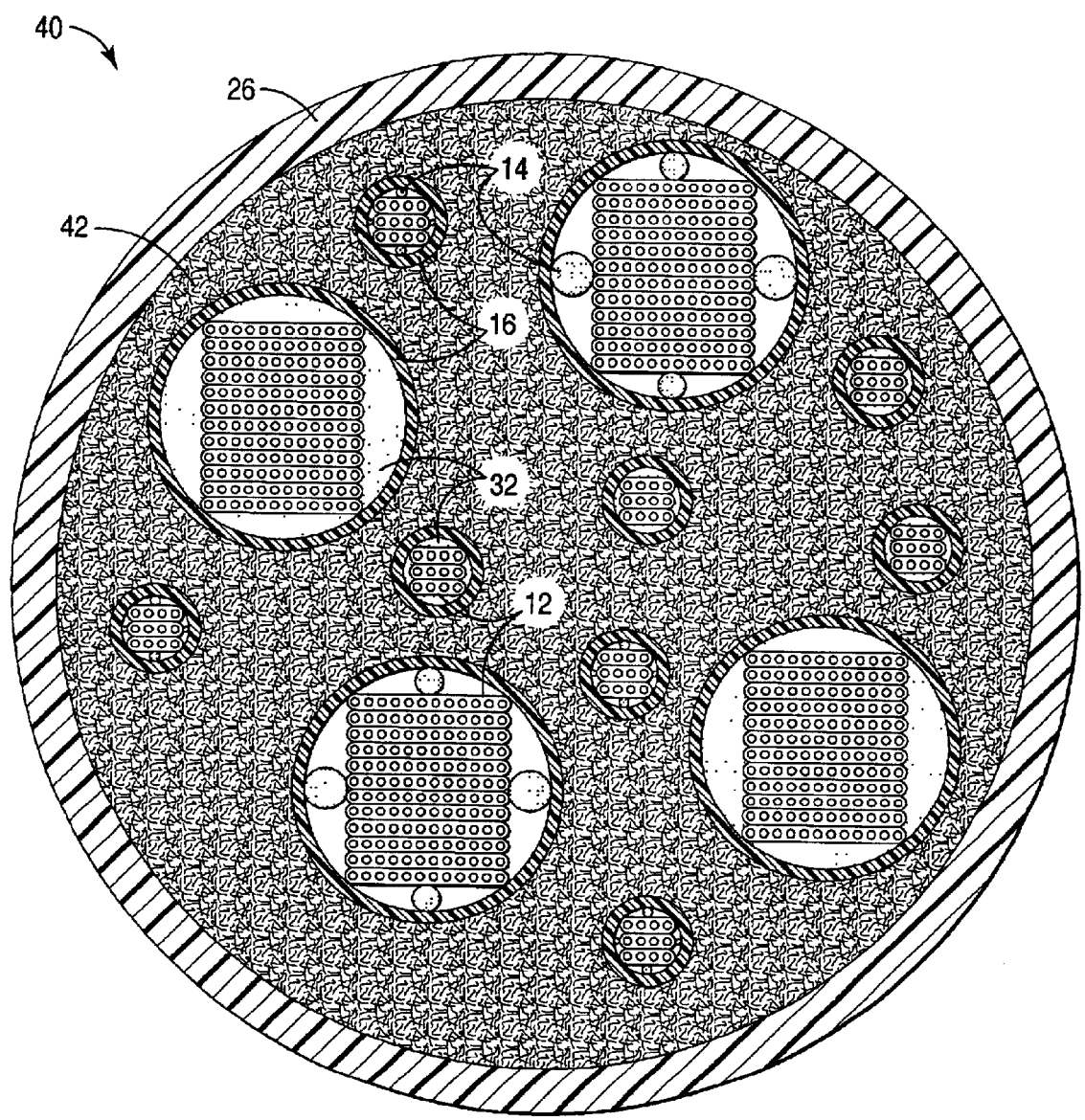
FIG. 4 is a cross-sectional view of an optical fiber cable according to still another embodiment of the invention.

Referring now to FIG. 4, shown is a cross-sectional view of an optical fiber cable 40 according to another embodiment of the invention. The optical fiber cable 40 includes a protective jacket 26 formed around a plurality of multi-fiber unit tubes 16. In this embodiment, the protective jacket 26 is dimensioned to allow for the multi-fiber unit tubes 16 to be loosely encased therein. The area between the protective jacket 26 and the multi-fiber unit tube 16 contains, e.g., superabsorbent tape, powder or yarn to reduce or prevent water propagation in the interstitial areas between the protective jacket 26 and the multi-fiber unit tube 16. Alternatively, the area between the protective jacket 26 and the multi-fiber unit tube 16 includes a filling compound (shown generally as 42), e.g., a water-blocking grease, gel or other suitable filling compound.

The multi-fiber unit tubes 16 encase a respective stacked plurality of optical fiber ribbons 12, e.g., 12-fiber ribbon stacks comprising 3 4-fiber ribbons, 144 -fiber ribbon stacks comprising 12 12-fiber ribbons, and/or 72-fiber ribbon stacks comprising 9 8-fiber ribbons. According to embodiments of the invention, at least one of the multi-fiber unit tubes 16 includes one or more filler materials 14 such as stranded yarn fillers, e.g., as discussed hereinabove. Alternatively, at least one of the multi-fiber unit tubes 16 includes water-blocking grease, gel or other suitable filling compound 32.

Referring now to FIG. 5, shown is a cross-sectional view of an optical fiber cable 50 according to yet another embodiment of the invention. The optical fiber cable 50 includes a protective jacket 26 formed around a plurality of multi-fiber unit tubes 16. However, rather than the multi-fiber unit tubes 16 being loosely encased in the protective jacket 26, according to this embodiment of the invention, the multi-fiber unit tubes 16 are stranded together, e.g., in a SZ configuration, as shown.

According to embodiments of the invention, a respective stacked plurality of optical fiber ribbons 12 is encased in the multi-fiber unit tube 16. As discussed, hereinabove, the ribbon stack contains any suitable number of optical fibers, e.g., 144 fibers via 12 12-fiber ribbons, 12 fibers via 3 4-fiber ribbons, and/or 72 fibers via 9 8-fiber ribbons. Also, at least one of the multi-fiber unit tubes 16 includes one or more filler materials such as stranded yarn fillers 14 or, alternatively, a water-blocking grease, gel or other suitable filling water-blocking or water-absorbing compound 32. Also, alternatively, the relatively small area between the protective jacket 26 and the multi-fiber unit tubes 16 includes a filling compound, e.g., a water-blocking grease, gel or other suitable filling compound 42 such as a woven strand of yarn or nonwoven tape.

Optical fiber cables according to embodiments of the invention are suitable for use in various optical communication systems. Referring now to FIG. 6, shown is a simplified block diagram of an optical communication system 60 according to embodiments of the invention is shown. The system 60 includes one or more sources 62 for transmitting optical information, an optical transmission medium 64 such as one or more optical cables configured according to embodiments of the invention, and one or more receivers 66 for receiving the transmitted information. The source 62, which is configured to transmit optical information, is coupled to the optical transmission medium 64, e.g., in a conventional manner. The receiver 66, which is configured to receive the transmitted optical information, is coupled to the optical transmission medium 64, e.g., in a conventional manner.

It will be apparent to those skilled in the art that many changes and substitutions can be made to the embodiments of the optical fiber cables herein described without departing from the spirit and scope of the invention as defined by. the appended claims and their full scope of equivalents.

What is claimed is:

1. An optical cable, substantially without a central strength member, the optical cable comprising:
   at least one multi-fiber unit tube dimensioned to receive a plurality of optical fibers, the unit tube being substantially circular and having an inner diameter (D), wherein the modulus of the at least one multi-fiber unit tube is less than 70,000 psi;
   a stacked plurality of optical fiber ribbons positioned within the multi-fiber unit tube, the stacked plurality of optical fiber ribbons having a diagonal length (d), wherein the ratio of the diagonal length (d) of the stacked plurality of optical fiber ribbons to the inner diameter (D) of the multi-fiber unit tube is at least 0.90; and
   a filling material disposed between the stacked plurality of optical fiber ribbons and the multi-fiber unit tube.

2. The apparatus as recited in claim 1, wherein the diagonal length (d) of the stacked plurality of optical fiber ribbons is approximately equal to the inner diameter (D) of the multi-fiber unit tube.

3. The apparatus as recited in claim 1, wherein the filling material is selected from the group consisting of at least one yarn and nonwoven tape.

4. The apparatus as recited in claim 1, wherein the filling material includes water-swellable super absorbent powder (SAP).

5. The apparatus as recited in claim 1, wherein at least one of the multi-fiber unit tubes is made from a material selected from the group consisting of low-density polyethylene (LDPE), linear low-density polyethylene (LLDPE), ultra-low-density polyethylene, highly plasticized polyvinylchloride (PVC), extrudable thermoplastic elastomers, ethylene/vinyl acetate copolymers, ethylene/acrylic acid copolymers and flexible polyolefin-based elastomers.

6. The apparatus as recited in claim 1, wherein the filling material further comprises a hydrophobic, thixotropic gel.

7. The apparatus as recited in claim 1, wherein the stacked plurality of optical fiber ribbons further comprises an array of optical fibers selected from the group consisting of a 3×4 array, a 12×12 array, a 6×8 array, a 4×12 array, a 9×8 array, a 6×12 array and a 8×12 array.

8. The apparatus as recited in claim 1, further comprising at least one protective jacket formed around the at least one multi-fiber unit tube.

9. The apparatus as recited in claim 8, wherein the protective jacket is made of a material selected from the group consisting of high-density polyethylene (HDPE), medium-density polyethylene (MDPE), linear low-density polyethylene (LLDPE), polyvinylchloride (PVC), polyamides, and low-smoke zero-halogen filled polyolefins.

10. The apparatus as recited in claim 1, wherein the at least one multi-fiber unit tube further comprises a plurality of multi-fiber unit tubes stranded together in a SZ configuration.

11. An optical cable, substantially without a central strength member, the optical cable, comprising:
    at least one multi-fiber unit tube dimensioned to receive a plurality of optical fibers therein, the at least one multi-fiber unit tube having a shape and a modulus less than 70,000 psi;
    a plurality of optical fibers positioned within the multi-fiber unit tube;
    wherein at least one of the plurality of optical fibers positioned within the multi-fiber unit tubes further comprises a stacked plurality of optical fiber ribbons; and
    a filling material disposed between the plurality of optical fibers and the multi-fiber unit tube, wherein the filling material maintains the shape of the multi-fiber unit tube.

12. The apparatus as recited in claim 11, wherein the filling material is selected from the group consisting of at least one yarn and nonwoven tape.

13. The apparatus as recited in claim 11, wherein the filling material includes water-swellable super absorbent powder (SAP).

14. The apparatus as recited in claim 11, wherein the multi-fiber unit tube has an inner diameter (D), wherein the stacked plurality of optical fiber ribbons has a diagonal length (d), and wherein the ratio of the diagonal length of the stacked plurality of optical fiber ribbons (d) to the inner diameter of the multi-fiber unit tube (D) is at least 0.90.

15. The apparatus as recited in claim 11, wherein the multi-fiber unit tube has an inner diameter (D), wherein the stacked plurality of optical fiber ribbons has a diagonal length (d), and wherein the inner diameter of the multi-fiber unit tube is approximately equal to the diagonal length of the stacked plurality of optical fiber ribbons.

16. The apparatus as recited in claim 11, wherein at least one of the multi-fiber unit tubes is made from a material selected from the group consisting of low-density polyethylene (LDPE), linear low-density polyethylene (LLDPE), ultra-low-density polyethylene, highly plasticized polyvinyl chloride (PVC), extrudable thermoplastic elastomers, ethylene/vinyl acetate copolymers, ethylene/acrylic acid copolymers and flexible polyolefin-based elastomers.

17. The apparatus as recited in claim 11, wherein the filling material further comprises a hydrophobic, thixotropic gel.

18. The apparatus as recited in claim 11, wherein the at least one multi-fiber unit tube further comprises a plurality of multi-fiber unit tubes stranded together in a SZ configuration.

19. The apparatus as recited in claim 11, further comprising at least one protective jacket formed around the at least one multi-fiber unit tube.

20. The apparatus as recited in claim 19, wherein the protective jacket is made of a material selected from the group consisting of high-density polyethylene (HDPE), medium-density polyethylene (MDPE), linear low-density polyethylene (LLDPE), polyvinylchloride (PVC), polyamides, and low-smoke zero-halogen filled polyolefins.

21. The system as recited in claim 19, wherein the optical cable further comprises at least one strength member formed in the protective jacket.

22. An optical waveguide system for transmitting optical information, comprising:
    at least one source of optical energy;
    an optical cable coupled to the source for transmitting optical energy from the source; and
    a receiver coupled to the optical cable for receiving optical energy from the source,
    wherein the optical cable is configured substantially without a central strength member, and wherein the optical cable further comprises
        at least one multi-fiber unit tube having therein a plurality of optical fibers, the unit tube being substantially circular and having an inner diameter (D) and a modulus less than 70,000 psi,
        a stacked plurality of optical fiber ribbons having a diagonal length (d) and positioned within the multi-fiber unit tube,
        wherein the ratio of the diagonal length of the stacked plurality of optical fiber ribbons (d) to the inner diameter of the multi-fiber unit tube (D) is at least 0.90, and
        a filling material disposed between the plurality of optical fibers and the multi-fiber unit tube.

23. The system as recited in claim 22, wherein the filling material is selected from the group consisting of at least one yarn and nonwoven tape.

24. The system as recited in claim 22, wherein the filling material is disposed between the plurality of optical fibers and the multi-fiber unit tube in such a way that maintains the shape of the mufti-fiber unit tube.

25. The system as recited in claim 22, wherein at least one of the multi-fiber unit tubes is made from a material selected from the group consisting of low-density polyethylene (LDPE), linear low-density polyethylene (LLDPE), ultra-low-density polyethylene, highly plasticized polyvinyl chloride (PVC), extrudable thernoplastic elastomers, ethylene/vinyl acetate copolymers, ethylene/tacrylic acid copolymers and flexible polyolefin-based elastomers.

26. The system as recited in claim 22, wherein the filling material further comprises a hydrophobic, thixotropic gel.

27. The system as recited in claim 22, wherein the optical cable further comprises at least one protective jacket formed around the at least one multi-fiber unit tube.

28. The system as recited in claim 27, wherein the protective jacket is made of a material selected from the group consisting of high-density polyethylene (HDPE), medium-density polyethylene (MDPE), linear low-density polyethylene (LLDPE), polyvinylchlorde (PVC), polyamides, and low-smoke zero-halogen filled polyolefins.

* * * * *